United States Patent
Garrity et al.

[19]

[11] Patent Number: 5,886,562
[45] Date of Patent: Mar. 23, 1999

[54] METHOD AND APPARATUS FOR SYNCHRONIZING A PLURALITY OF OUTPUT CLOCK SIGNALS GENERATED FROM A CLOCK INPUT SIGNAL

[75] Inventors: Douglas A. Garrity; Danny A. Bersch, both of Gilbert, Ariz.

[73] Assignee: Motorola, Inc., Schaumburg, Ill.

[21] Appl. No.: 773,293

[22] Filed: Dec. 26, 1996

[51] Int. Cl.[6] .................................................. H03K 17/62
[52] U.S. Cl. ........................... 327/415; 327/99; 327/154; 327/161; 327/404
[58] Field of Search .................................. 327/291–299, 327/99, 403, 404, 407–410, 415, 416, 256–259, 141, 154, 161–163

[56] References Cited

U.S. PATENT DOCUMENTS

| | | | |
|---|---|---|---|
| 5,124,572 | 6/1992 | Mason et al. | 327/145 |
| 5,306,962 | 4/1994 | Lamb | 327/259 |
| 5,450,084 | 9/1995 | Mercer | 341/153 |
| 5,519,666 | 5/1996 | McAdams | 365/233.5 |
| 5,532,633 | 7/1996 | Kawai | 327/174 |

FOREIGN PATENT DOCUMENTS 58-145225  8/1983  Japan ..................................... 327/295

OTHER PUBLICATIONS

Research Disclosure, No. 295, Kenneth Mason Publications Ltd, England. Nov. 1988.

R. Gregorian et al., "Analog MOS Integrated Circuits for Signal Processing", A vol. in the Wiley Series on Filters: Design, Manufacturing and Applications; A Wiley Interscience Publication, 1986, pp. 516–517.

*Primary Examiner*—Kenneth B. Wells
*Attorney, Agent, or Firm*—Robert D. Atkins

[57] ABSTRACT

A clock circuit for generating alternate clock phases ($P_1$, $P_2$) whose trailing edges define sampling points of an analog-to-digital converter (106). Complementary signals (CLOCK0, CLOCK1) are generated from a system clock ($F_{SYS}$) and switched through transmission gates (340–341, 342–343) when an enable signal ($V_{EN}$) is applied. The system clock ($F_{SYS}$) is delayed by a delay circuit (316) to produce the enable signal ($V_{EN}$) after the complementary signals (CLOCK0, CLOCK1) are stable, thereby synchronizing the complementary signals (CLOCK0, CLOCK1) with the enable signal ($V_{EN}$).

22 Claims, 3 Drawing Sheets

METHOD AND APPARATUS FOR SYNCHRONIZING A PLURALITY OF OUTPUT CLOCK SIGNALS GENERATED FROM A CLOCK INPUT SIGNAL

CROSS REFERENCE TO RELATED PATENT APPLICATIONS

The present application is related to copending U.S. patent application Ser. No. 08/610,178, Attorney's Docket CR00071M, entitled "Non-Overlapping Clock Generator Circuit and Method Therefor", filed Mar. 4, 1996, by Garrity, et al., and assigned to the same assignee, Motorola Inc.

BACKGROUND OF THE INVENTION

The present invention relates in general to integrated circuits and, more particularly, to a non-overlapping clock generator having synchronized clock transitions.

Signal processing functions are often implemented more economically using digital rather than analog methods. For example, a wireless communication device such as a cellular telephone or pager often uses fewer external tuning components if a transmitted carrier signal is converted to digital data at an early stage in the receiver of the communication device. A high frequency analog-to-digital converter (ADC) is used to convert the analog carrier signal to digital data. A preprogrammed mathematical demodulation algorithm extracts a demodulated signal from the digital data.

A typical high frequency ADC includes a plurality of parallel, time-interleaved, ADC channels which sample the analog carrier signal at alternating sampling points defined by the trailing edges of alternate clock phases. The alternate clock phases are non-overlapping to prevent a race condition from occurring. Each channel produces a data word representative of the amplitude of the carrier signal at the sampling point. A digital output data stream is formed by interleaving data words from each channel.

A low error rate in the digital data requires symmetry among the parallel channels, including carefully matched components and timing signals. More specifically, an accurate representation of the carrier signal by the data stream depends on the carrier signal being sampled at equal time intervals. Accordingly, the alternate non-overlapping clock phases typically are referenced to a system clock. However, the clock phases are coupled through asymmetrical signal paths in the clock generator. The asymmetrical signal paths have different propagation delays due to having a different number of logic gates. The different propagation delays result in a relative phase shift in the trailing edges of the clock phases and in the carrier signal being sampled at unequal intervals. Therefore, spurious errors are generated in the digital data stream.

Hence, there is a need for a clock circuit which generates multiple non-overlapping clock phases whose trailing edges are synchronized to occur at equally spaced time intervals.

DETAILED DESCRIPTION OF THE DRAWINGS

Figure 1:
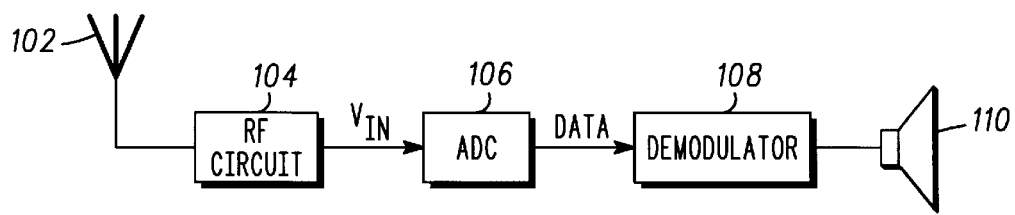
FIG. 1 is a block diagram of a wireless communication device.

FIG. 1 shows a block diagram of a wireless communications device 100 such as a cellular telephone or pager. A receiver signal path in communications device 100 includes an antenna 102 and a radio frequency (RF) circuit 104. Antenna 102 receives a transmitted RF carrier signal modulated with audio and control information. RF circuit 104 amplifies the RF carrier signal and converts the frequency down to an analog intermediate frequency (IF) signal designated as VIN within the frequency range of an analog-to-digital converter (ADC) 106. ADC 106 periodically samples IF signal $V_{IN}$ at an input and produces a digital data stream DATA comprising data words that represent the amplitudes of $V_{IN}$ at different sampling times. A demodulator 108 comprises a micro-controller which executes a preprogrammed mathematical demodulation algorithm stored in memory (not shown) to recover an audio signal that drives a speaker 110.

Figure 2:
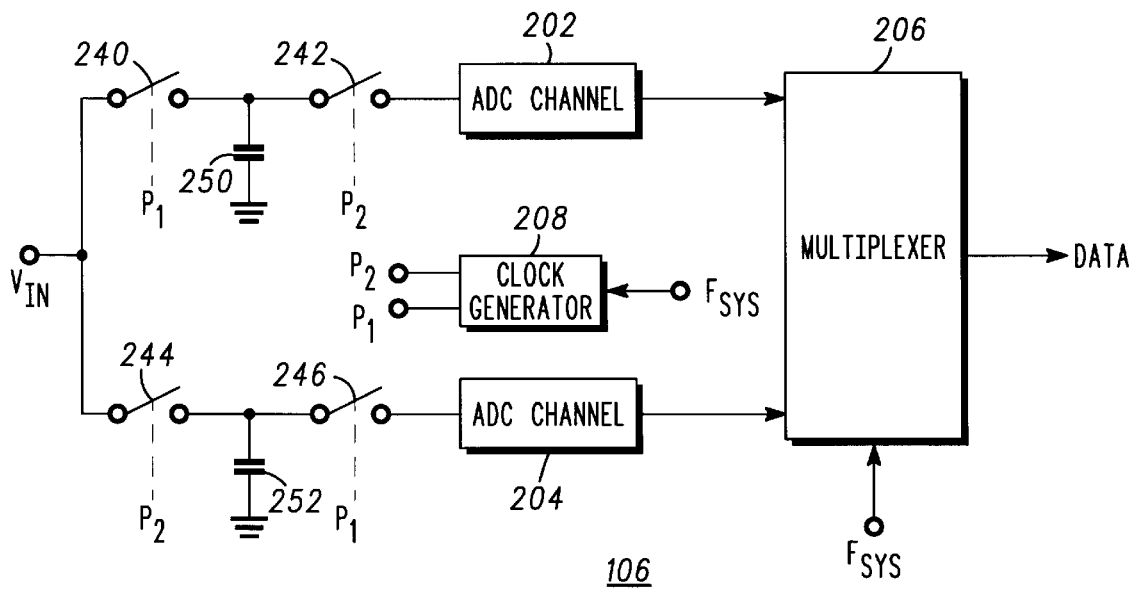
FIG. 2 is a block diagram of a time-interleaved analog-to-digital converter.

FIG. 2 shows a block diagram of ADC 106 comprising switches 240–246, capacitors 250 and 252, parallel time-interleaved ADC channels 202 and 204, a multiplexer 206, and a clock circuit 208. Elements having the same reference numbers provide similar functions. Switches 240–246 represent analog switching devices such as transmission gates, field-effect transistors, and the like, having control inputs (not shown) for providing switchable conductive signal paths when a control signal is applied.

Capacitor 250 cooperates with switches 240 and 242 to operate as a sample-and-hold (S/H) circuit for ADC channel 202. Switches 240 and 242 are initially open. In the sampling phase, switch 240 is closed during clock phase $P_1$ to charge capacitor 250 to the voltage level of $V_{IN}$ at the trailing edge of $P_1$, at which point switch 240 is opened. Switches 240 and 242 remain momentarily open for a time referred to as a first non-overlap period. Clock phase $P_2$ then closes switch 242 to initiate the hold phase, during which capacitor 250 holds the sampled voltage at an input of ADC channel 202 while ADC channel 202 converts the sampled voltage to a first digital data word at the output of channel 202. The first digital data word represents the amplitude of $V_{IN}$ at the trailing edge of clock phase $P_1$.

Capacitor 252 cooperates with switches 244 and 246 to operate as a S/H circuit for ADC channel 204. In the sampling phase, switch 244 is closed during clock phase $P_2$ to charge capacitor 252 to the voltage level of $V_{IN}$ at the trailing edge of $P_2$, at which point switch 244 is opened. Switches 240 and 242 remain momentarily open for a time referred to as a second non-overlap period. Clock phase $P_1$ then closes switch 246 to initiate the hold phase, during which capacitor 252 holds the sampled voltage at an input of ADC channel 204 while ADC channel 204 converts the sampled voltage to a second digital data word at the output of channel 204. The second digital data word represents the amplitude of $V_{IN}$ at the trailing edge of clock phase $P_2$.

Hence, the $V_{IN}$ voltage is sampled by ADC channel 202 during clock phase $P_1$ and converted to a first digital word coupled to a first input of multiplexer 206 during clock phase $P_2$. The $V_{IN}$ voltage is further sampled by ADC channel 204 during clock phase $P_2$ and converted to a second digital word coupled to a second input of multiplexer 206 during clock phase $P_1$. Multiplexer 206 interleaves the first and second digital words in response to system clock $F_{SYS}$ to produce a digital stream of DATA at an output. The digital DATA comprises digital words alternately produced by ADC channels 202 and 204 which represent analog signal $V_{IN}$ at the respective sampling points. Because of the interleaving architecture of ADC 106, input signal $V_{IN}$ is sampled at the frequency of $F_{SYS}$, while channels 202 and 204 operate at only one-half the $F_{SYS}$ frequency. The accuracy of DATA in representing $V_{IN}$ depends on carefully matching corresponding components to produce symmetrical characteristics in channels 202 and 204.

Clock circuit 208 in FIG. 2 has an input for receiving system clock $F_{SYS}$ and first and second outputs for providing non-overlapping clock phases $P_1$ and $P_2$ derived from $F_{SYS}$. In the embodiment shown in FIG. 2, where ADC 106 comprises two channels, clock phases $P_1$ and $P_2$ typically operate at one-half the frequency of $F_{SYS}$. However, a time-interleaved ADC could include a different number of parallel channels, in which case a corresponding number of non-overlapping clock phases would be generated. For example, in a time-interleaved ADC having three parallel channels, a clock generator would typically produce three non-overlapping clock phases, each clock phase operating at one-third the frequency of the system clock.

In order to prevent spurious frequency components from being produced in digital data stream DATA, $V_{IN}$ samples should be taken at equally spaced time intervals, such as every 20.0 nanoseconds. For example, if the trailing edges of $P_1$ occur at say 0.0 nanoseconds and 40.0 nanoseconds, the trailing edges of $P_2$ should occur at 20.0 and 60.0 nanoseconds so that $V_{IN}$ is sampled every 20.0 nanoseconds, at 0.0, 20.0, 40.0 and 60.0 nanoseconds. However, most if not all conventional time-interleaved ADCs include a clock generator that has first and second cross-coupled signal paths with an unequal number of logic gates in the signal paths. The propagation delay through one signal path is different from the propagation delay through the other signal path. Therefore, the asymmetrical signal paths through a clock generator result in trailing edges of $P_2$ that are phase shifted with respect to the trailing edges of $P_1$. The shift or skew is typically on the order of a propagation delay of a logic gate. For example, if a gate delay is 1.0 nanoseconds, the trailing edges of $P_2$ are shifted from 20.0 to 21.0 and from 60.0 to 61.0 nanoseconds, such that $V_{IN}$ is alternately sampled at 0.0, 21.0, 40.0 and 61.0 nanoseconds. The resulting sampling intervals are unequally spaced at 21.0, 19.0, 21.0, etc. nanoseconds, a 21.0–19.0=2.0 nanosecond asymmetry.

At lower frequencies, such asymmetry may be tolerable because the phase shift is small in relation to the sampling intervals. However, at higher frequencies the phase shift comprises a substantial portion of a sampling interval. In the above example, the 2.0 nanosecond asymmetry comprises more than 10% of the sampling interval. The asymmetric sampling results in spurious components being introduced in the frequency response of ADC 106.

Figure 3:
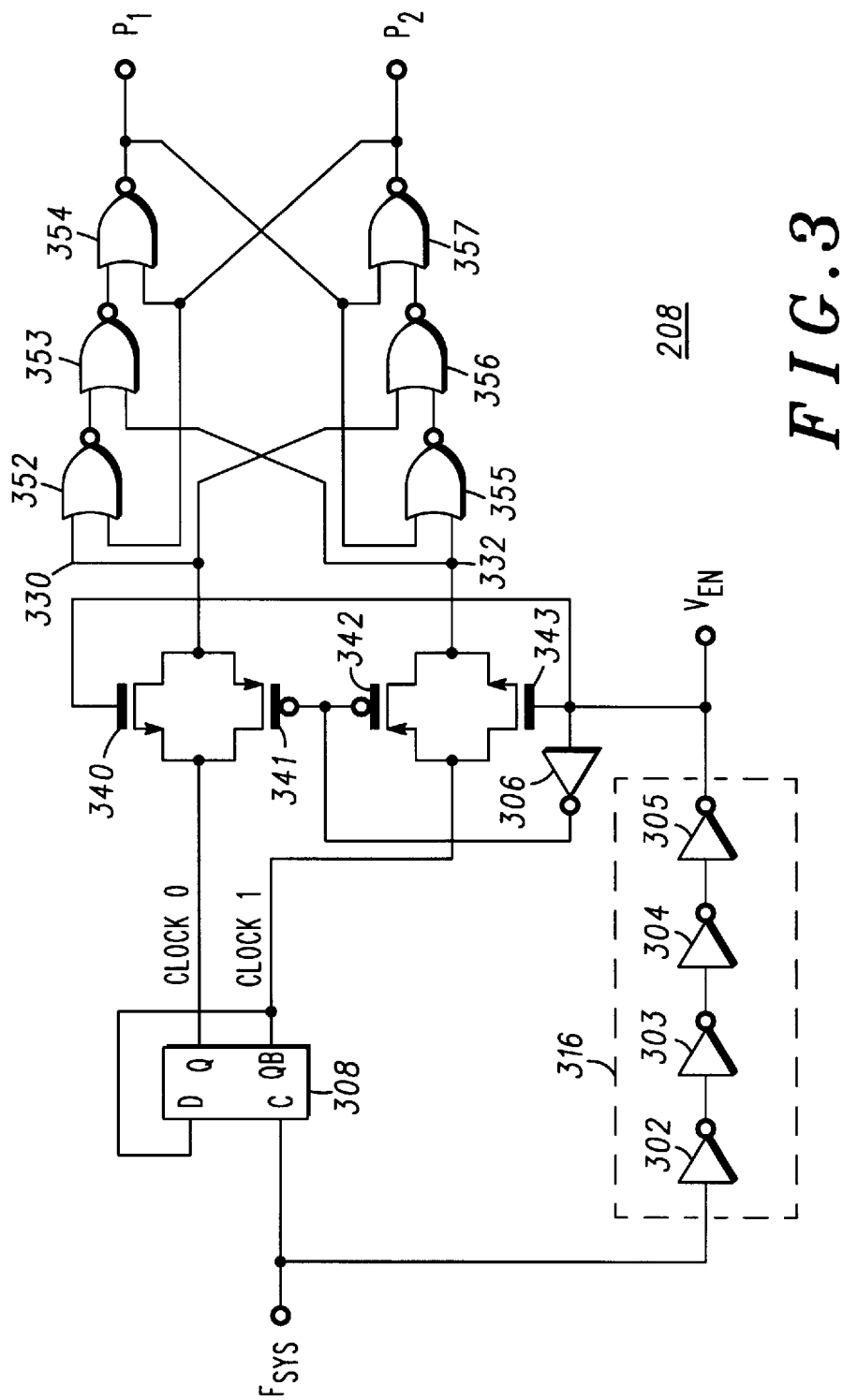
FIG. 3 is a schematic diagram of a clock generator.

FIG. 3 is a schematic diagram showing further detail of clock circuit 208 including an inverter 306, a flip-flop 308, a delay circuit 316, NOR gates 352–357 and transistors 340–343. Clock circuit 208 produces non-overlapping clock phases $P_1$ and $P_2$ in response to applying system clock $F_{SYS}$ to an input of delay circuit 316 and to a clock input of flip-flop 308. Delay circuit 316 includes serially coupled inverters 302–305.

NOR gates 352–357 are configured as first and second cross-coupled signal paths respectively formed by gates 352–354 and 355–357 to operate as a latch circuit in which $P_1$ makes a transition from logic 1 to logic 0 before $P_2$ makes a logic 0 to logic 1 transition. Similarly, $P_2$ makes a transition from logic 1 to logic 0 before $P_1$ makes a logic 0 to logic 1 transition. Therefore, between the logic 1 to logic 0 transition of $P_1$ and the logic 0 to logic 1 transition of $P_2$, both $P_1$ and $P_2$ are momentarily at logic 0 for period of time designated as a first non-overlap delay. Similarly, $P_2$ makes a transition from logic 1 to logic 0 before $P_1$ makes a logic 0 to logic 1 transition such that both $P_1$ and $P_2$ are momentarily at logic 0 for period of time designated as a second non-overlap delay. NOR gates 352–357 thereby provide the function of a non-overlapping clock generator. The function of a non-overlapping clock generator can alternatively be provided using NAND gates or other combinational logic.

The first non-overlap delay corresponds to a delay through first signal path 352–354 and the second non-overlap delay corresponds to a delay through second signal path 355–357. It should be apparent that the non-overlap delays can be modified by changing the number of serially coupled gates in the respective signal paths 352–354 and 355–357. For example, the non-overlap delays can be increased by increasing the number of gates in signal paths 352–354 and 355–357 to produce incremental increases in propagation delay through the signal paths. Alternatively, the non-overlap delays can be adjusted by changing a capacitive load in signal paths 352–354 and 355–357.

Clock circuit 208 is used in ADC 106 to generate clock phases $P_1$ and $P_2$ for setting the sampling points of analog input signal $V_{IN}$. Optimum performance is achieved by configuring clock circuit 208 to have a maximum degree of symmetry in the $P_1$ and $P_2$ signals. That is, the trailing edge of $P_1$ should be phase aligned to the trailing edge of $P_2$. In particular, gates 352–354 are preferably matched to gates 355–357 such that the respective delays through signal paths 352–354 and 355–357 as well as the resulting first and second non-overlap delays are matched.

Flip-flop 308 comprises a plurality of logic gates operating as a "D" type flip-flop clocked on leading edges of system clock $F_{SYS}$. Complementary output signals CLOCK0 and CLOCK1 are provided at true and complement outputs Q and QB, respectively. QB is further coupled to a "D" input of flip-flop 308 to provide a divide-by-two function such that CLOCK0 and CLOCK1 operate at one-half the frequency of system clock $F_{SYS}$. Alternative configurations can be used for providing the function of flip-flop 308, such as using a toggle flip-flop. CLOCK0 and CLOCK1 are asynchronous signals, owing to asymmetric propagation delays in flip-flop 308. The propagation delay through flip-flop 308 to the Q output is different than the propagation delay to the QB output. One of CLOCK0 or CLOCK1 makes a logic 0 to logic 1 transition before the other of CLOCK0 or CLOCK1 makes a logic 1 to logic 0 transition, so that transitions of CLOCK0 and CLOCK1 are not phase aligned. More specifically, CLOCK0 makes a transition from logic 0 to logic 1 before CLOCK1 makes a transition from logic 1 to logic 0. Similarly, CLOCK1 makes a transition from logic 0 to logic 1 before CLOCK0 makes a transition from logic 1 to logic 0. Thus, CLOCK0 leads CLOCK1 on a portion of the transitions and CLOCK1 leads CLOCK0 on another portion of the transitions. In an alternate embodiment of flip-flop 308, the signal making a logic 1 to logic 0 transition leads the signal making a logic 0 to logic 1 transition. However, the complementary output signals in the alternate embodiment are not phase aligned.

Delay circuit 316 includes a plurality of serially coupled inverters 302–305 which produce control signal $V_{EN}$ at the output of inverter 305 by delaying $F_{SYS}$ applied to the input of inverter 302. Delay circuit 316 delays $F_{SYS}$ an amount sufficient to ensure that CLOCK0 and CLOCK1 become stable in response to being activated by $F_{SYS}$ in flip-flop 308 before $V_{EN}$ is produced. For example, if the Q and QB outputs of flip-flop 308 become stable, albeit asynchronously, say 2.0 nanoseconds after activation by $F_{SYS}$, then the delay through delay circuit 316 is set to say 4.0 nanoseconds. While delay circuit 316 is shown having four inverters 302–305, the number of serially coupled inverters can be changed to modify the amount of delay produced by delay circuit 316. For example, if the longest signal path in flip-flop 308 had five gates, delay circuit 316 could be configured with six serially coupled inverters or other logic gates. Typically, the number of inverters in delay circuit 316 exceeds the number of gates in the longest signal path through flip-flop 308. Inverters 302–305 are matched to internal gates of flip-flop 308 to ensure that over a wide range of manufacturing parameters $V_{EN}$ is delayed until after CLOCK0 and CLOCK1 have both settled. Delay circuit 316 can be alternatively configured, such as by using capacitors to load gates 302–305 for delaying $V_{EN}$. Inverter 306 receives enable signal $V_{EN}$ at an input and produces inverted enable signal $V_{ENINV}$ at an output.

In an alternate embodiment, delay circuit 316 can be implemented by providing a second non-overlapping clock generator similar to clock generator 352–357 but running at the frequency of system clock $F_{SYS}$. The delayed enable signal $V_{EN}$ is taken from, for example, the equivalent $P_1$ output of the second non-overlapping clock generator. Transistors 340–343 comprise a switching circuit in which transistor 340 is an n-channel metal-oxide-semiconductor field-effect (NMOS) transistor combining with p-channel metal-oxide-semiconductor field-effect (PMOS) transistor 341 to operate as a transmission gate 340–341. The respective drains and sources of transistors 340 and 341 are coupled in common as shown to operate as a switch providing a conduction path between CLOCK0 and an input of gate 352 at node 330. The conduction path is formed when a high enable signal $V_{EN}$ is applied to the gate of NMOS transistor 340 or inverted enable signal $V_{ENINV}$ is applied to the gate of PMOS transistor 341.

The switching circuit further includes NMOS transistor 343 combining with PMOS transistor 342 to operate as a transmission gate 342–343. The respective drains and sources of transistors 342 and 343 are coupled in common as shown to operate as a switch providing a conduction path between CLOCK1 and an input of gate 355 at node 332. The conduction path is formed when a high $V_{EN}$ is applied to the gate of NMOS transistor 343 or a low $V_{ENINV}$ is applied to the gate of PMOS transistor 342.

It will be noted that inverted enable signal $V_{ENINV}$ is delayed with respect to enable signal $V_{EN}$ by virtue of the propagation delay of inverter 306. As a result, PMOS transistors 341 and 342 are delayed in forming conduction paths as compared with NMOS transistors 340 and 343. However, the delay in turning on PMOS transistors 341 and 342 has little or no discernible effect on the synchronization of CLOCK0 and CLOCK1 as described below.

As a feature of the present invention, NMOS transistors 340 and 343 operate symmetrically such that conduction paths are formed for transferring signals of either logic level. Because the capacitances on nodes 330 and 332 retain the voltage level of the previous cycle, NMOS transistors 340 and 343 operate with one conduction terminal at a high voltage and the other conduction terminal at a low voltage. The conduction terminal at the high voltage operates as a drain and the conduction terminal at the low voltage operates as a source. The roles of drain and source thus alternate between conduction terminals on each cycle. For example, assume the first conduction terminal of NMOS transistor 340 receives CLOCK0 and the second conduction terminal is coupled to node 330 having capacitance charged to a high voltage level. Then CLOCK0 will be at a low voltage at the time $V_{EN}$ is applied and the first conduction terminal will therefore operate as a source. When the capacitance on node 330 is charged to a low voltage, CLOCK0 is at a high voltage at the time $V_{EN}$ is applied. The second conduction terminal will therefore operate as a source.

When the voltage at say node 330 makes a low to high voltage transition, NMOS transistor 340 turns off at the point where the node 330 voltage is within a transistor threshold voltage of the CLOCK0 voltage. Therefore, the noise margin is reduced by the transistor threshold voltage for a brief period of time. More specifically, inverted enable signal $V_{ENINV}$ is applied to PMOS transistor 341 after a gate delay of inverter 306, at which point PMOS transistor 341 provides the conduction path between CLOCK0 and node 330 for restoring the noise margin. The synchronization of CLOCK0 and CLOCK1 is substantially unaffected by the delay of $V_{ENINV}$, however, because NMOS transistor 340 pulls node 330 well past the switching threshold of gate 352 before $V_{ENINV}$ is applied.

In some applications, the benefit in noise margin gained by using PMOS transistors 341 and 342 for switching can be outweighed by the cost of providing PMOS transistors 341 and 342 and an inverted enable signal. In such cases, the PMOS transistor can often be omitted completely with little reduction in performance. In that case, the NMOS transistors 340 and 343 operate as the switching circuit.

In other applications, where it is essential to attain the maximum degree of synchronization in enabling the NMOS and PMOS transistors, enable and inverted enable signals $V_{EN}$ and $V_{ENINV}$ can be generated using differential logic circuits such as emitter-coupled logic circuits, source-coupled logic circuits, and the like. Such logic circuits are characterized by differential amplifier stages which produce synchronous complementary output signals and are therefore adequate to generate $V_{EN}$ and $V_{ENINV}$. For example, the functions of inverters 305 and 306 could be combined into a single differential logic circuit providing $V_{EN}$ and $V_{ENINV}$ at inverting and noninverting outputs, respectively, in response to an output signal from gate 304. Where the differential logic family has logic voltages that are incompatible with the logic family of clock circuit 208, standard logic translators can be interposed at the input and output of the differential logic circuit.

Figure 4:
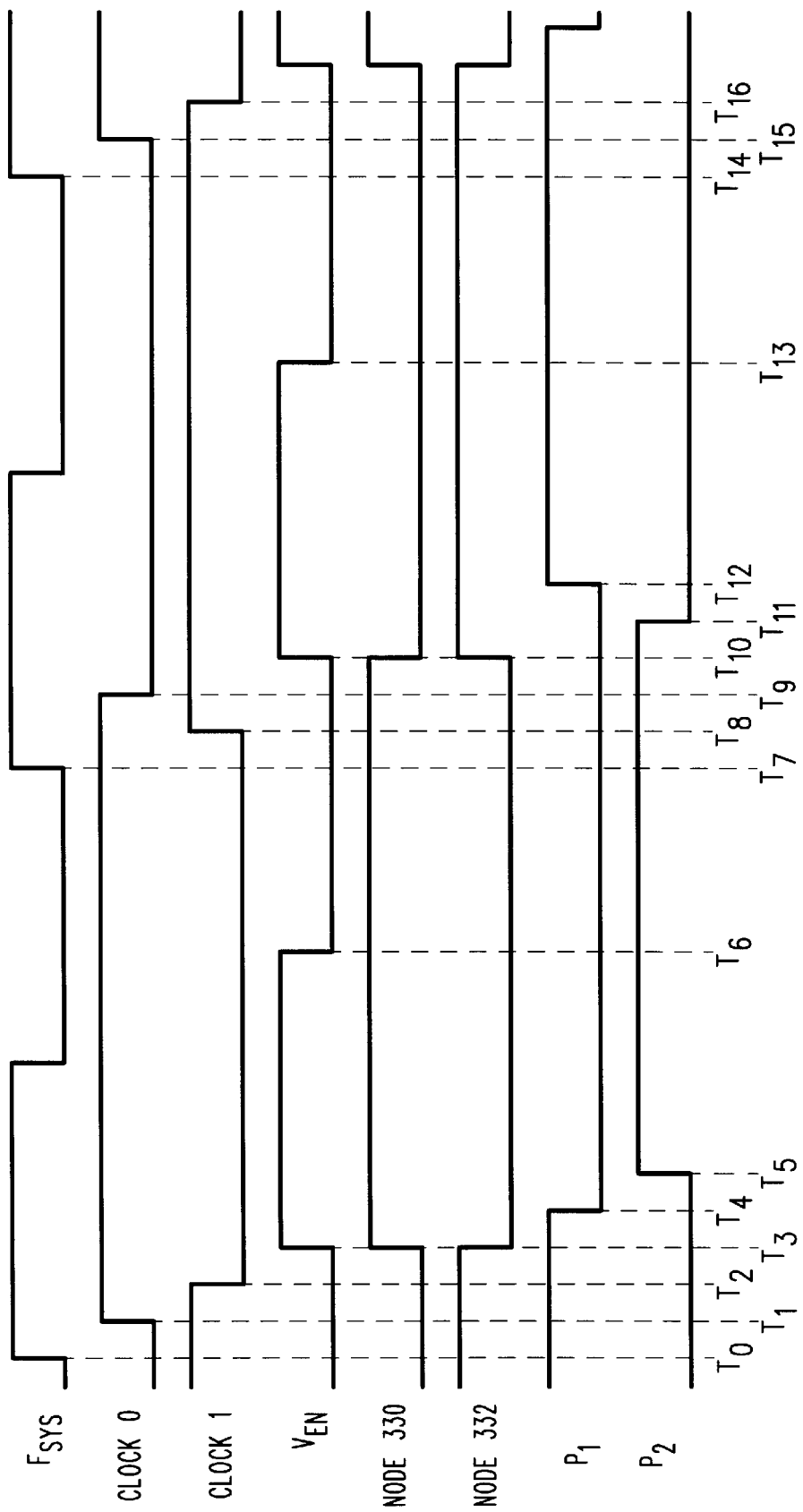
FIG. 4 is a timing diagram of the clock generator.

Operation of clock circuit 208 is best seen by referring to the timing diagram of FIG. 4. Flip-flop 308 is clocked on leading edges of system clock $F_{SYS}$ at times $T_0$ and $T_7$, producing complementary signals CLOCK0 and CLOCK1. Flip-flop 308 operates such that CLOCK0 makes a logic 0 to logic 1 transition before CLOCK1 makes a logic 1 to logic 0 transition. Similarly, CLOCK1 makes a logic 0 to logic 1 transition before CLOCK0 makes a logic 1 to logic 0 transition. In particular, CLOCK0 has a leading edge at time $T_1$, and a trailing edge at time $T_9$ and CLOCK1 has a trailing edge at time $T_2$ and a leading edge at time $T_8$, as shown. Therefore, the transition edges of CLOCK0 and CLOCK1 are not phase aligned.

$F_{SYS}$ is delayed through inverters 302–305 to produce enable signal $V_{EN}$ at times $T_3$ and $T_{10}$ for enabling transmission gates 340–341 and 342–343 after CLOCK0 and CLOCK1 are settled. Delay circuit 316 is implemented with sufficient delay to ensure that CLOCK0 and CLOCK1 are stable after activation by $F_{SYS}$ before enable signal $V_{EN}$ is produced. When enabled, transmission gates 340–341 and 342–343 provide conduction paths for transferring CLOCK0 and CLOCK1 to nodes 330 and 332. The transfers are made concurrently with $V_{EN}$ such that CLOCK0 and CLOCK1 are edge aligned or synchronized at nodes 330 and 332 at times $T_3$ and $T_{10}$.

Clock phase $P_1$ is referenced to the voltage at node 330 and clock phase $P_2$ is referenced to the voltage at node 332. Where gates 352–354 are matched to gates 355–357, clock phases $P_1$ and $P_2$ are generated with a high degree of symmetry. In particular, the trailing edge of clock phase $P_1$ is produced at time $T_4$, three gate delays (signal path 352–354) after $V_{EN}$ is applied at time $T_3$. The trailing edge of clock phase $P_2$ is produced at time $T_{11}$, three gate delays (signal path 355–357) after $V_{EN}$ is applied at time $T_{10}$. By synchronizing the transition edges of CLOCK0 and CLOCK1 the present invention a higher degree of symmetry in clock phases $P_1$ and $P_2$ than what is achievable using previous clock circuits.

Because enable signal $V_{EN}$ is derived by delaying $F_{SYS}$, $V_{EN}$ operates at the same frequency as $F_{SYS}$ i.e., at twice the frequency of CLOCK0 and CLOCK1. Therefore, transmission gates 340–341 and 342–343 are only enabled for a portion of the CLOCK0 and CLOCK1 periods until $V_{EN}$ is removed at times $T_6$ and $T_{13}$. The voltage levels of nodes 330 and 332 are maintained until the next cycle, however, because of the capacitances associated with nodes 330 and 332.

By now it should be appreciated that the present invention reduces data errors in a multiple channel time-interleaved ADC by substantially reducing or eliminating inequalities in sampling intervals of an analog input signal. The sampling intervals correspond to trailing edges of non-overlapping clock phases $P_1$ and $P_2$ produced at outputs of a latch in response to complementary signals being applied to respective signal paths of the latch. The inequalities in sampling intervals result from one of the complementary signals being delayed with respect to the other complementary signal.

In summary, first and second complementary signals are generated from a system clock, such as by frequency dividing the system clock, and respectively switched through first and second cross-coupled signal paths of the clock circuit when a control signal is applied. The system clock signal is delayed in a delay circuit such that the control signal is produced after the first and second complementary signals are settled at respective logic levels. By switching the first and second complementary signals with the control signal, transition edges of the first and second complementary signals are synchronized with the control signal at the first and second signal paths.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention. For example, the clock circuit described herein comprises two clock phases. However, the principles of the present invention can be applied to implement clock circuits having a greater number of parallel channels and a corresponding number of clock phases.

What is claimed is:

1. A method for synchronizing first and second signals, comprising the steps of:
   generating the first and second signals in response to a reference signal;
   delaying the reference signal for at least a time for the first and second signals to make a transition from a first logic level to a second logic level to produce a control signal; and
   switching the first and second signals through first and second conduction paths with a transition edge of the control signal to synchronize a transition edge of the first signal with a transition edge of the second signal for producing first and second output signals.

2. The method of claim 1, wherein the first and second signals are first and second clock signals.

3. The method of claim 2, wherein one transition of the first clock signal is phase aligned to one transition of the second clock signal.

4. The method of claim 2, wherein the first conduction path has a delay that matches a delay through the second conduction path so that the first and second output signals remain phase aligned at outputs of the first and second conduction paths.

5. The method of claim 1, wherein the step of switching the first and second signals includes the step of enabling conduction paths through first and second transmission gates in response to the control signal.

6. The method of claim 1, wherein the step of switching the first and second signals includes the step of enabling conduction paths through first and second pass transistors in response to the control signal.

7. The method of claim 1, wherein the step of delaying the reference signal includes the step of routing the reference signal through a plurality of serially coupled logic gates.

8. A method for synchronizing first and second signals, comprising the steps of:
   frequency dividing a reference signal to produce the first and second signals, wherein the first and second signals are first and second clock signals;
   delaying the reference signal for a first delay to produce a control signal, wherein the first delay is at least a time for the first and second signals to make a transition from a first logic level to a second logic level; and
   switching the first and second clock signals through first and second conduction paths with a transition edge of the control signal to synchronize a transition edge of the first signal with a transition edge of the second signal for producing first and second output signals.

9. A synchronizing circuit, comprising:
   a delay circuit having an input coupled for receiving a reference signal and providing an enable signal after a first delay; and
   a switching circuit having first and second inputs coupled for receiving first and second signals generated from the reference signal within a time less than the first delay, a control input coupled for receiving the enable signal, and first and second outputs for providing first and second output signals synchronized in response to the enable signal.

10. The synchronizing circuit of claim 9, further comprising a signal generator having an input coupled for receiving the reference signal and producing the first and second signals at first and second outputs.

11. The synchronizing circuit of claim 9, wherein the first and second signals reach a first logic level within the first delay after a logic transition from a second logic level.

12. The synchronizing circuit of claim 9, wherein the switching circuit includes:
   a first transistor having first conduction terminal coupled for receiving the first signal, a second conduction terminal coupled to the first output of the switching circuit, and a control terminal coupled for receiving the enable signal; and
   a second transistor having first conduction terminal coupled for receiving the second signal, a second conduction terminal coupled to the second output of the switching circuit, and a control terminal coupled for receiving the enable signal.

13. The synchronizing circuit of claim 9, wherein the first and second signals are first and second clock signals.

14. The synchronizing circuit of claim 13, wherein one transition of the first clock signal is phase aligned to one transition of the second clock signal.

15. The synchronizing circuit of claim 14, further including first and second signal paths coupled to the first and second outputs of the switching circuits, respectively, where the first and second signal paths are matched such that the first and second clock signals remain phase aligned.

16. The synchronizing circuit of claim 9, wherein the delay circuit comprises a plurality of serially coupled logic gates having an input coupled for receiving the reference signal and producing the enable signal at an output after the first delay.

17. A synchronizing circuit, comprising:
 a signal generator having an input coupled for receiving a reference signal and producing first and second signals at first and second outputs of the signal generator, wherein the first and second signals are provided at first and second outputs of a frequency divider;
 a delay circuit having an input coupled for receiving the reference signal and providing an enable signal after a first delay; and
 a switching circuit having first and second inputs coupled for receiving the first and second signals a control input coupled for receiving the enable signal, and first and second outputs for providing first and second output signals synchronized in response to the enable signal.

18. A synchronizing circuit comprising:
 a delay circuit having an input coupled for receiving a reference signal and providing an enable signal after a first delay;
 a switching circuit having first and second inputs coupled for receiving first and second signals generated from the reference signal, a control input coupled for receiving the enable signal, and first and second outputs for providing first and second output signals synchronized in response to the enable signal, wherein the switching circuit includes
  a first transistor having a first conduction terminal coupled for receiving the first signal, a second conduction terminal coupled to the first output of the switching circuit, and a control terminal coupled for receiving the enable signal; and
  a second transistor having first conduction terminal coupled for receiving the second signal, a second conduction terminal coupled to the second output of the switching circuit, and a control terminal coupled for receiving the enable signal;
  a third transistor having a first conduction terminal coupled for receiving the first signal, a second conduction terminal coupled to the first output of the switching circuit, and a control terminal coupled for receiving an inverted enable signal; and
  a fourth transistor having first conduction terminal coupled for receiving the second signal, a second conduction terminal coupled to the second output of the switching circuit, and a control terminal coupled for receiving the inverted enable signal.

19. An integrated analog-digital converter (ADC) that samples an analog input signal with a sampling clock signal for converting the analog input signal to a digital signal, comprising:
 a delay circuit having an input coupled for receiving a reference signal and providing an enable signal after a first delay;
 a switching circuit having first and second inputs coupled for receiving first and second clock signals generated from the reference signal, and a control input coupled for receiving the enable signal to align a transition edge of the first clock signal with a transition edge of the second clock signal to provide first and second synchronized signals at first and second outputs; and
 a clock generator having first and second inputs coupled to the first and second outputs of the switching circuit for receiving the first and second synchronized signals to provide first and second phases of the sampling clock signal at first and second outputs.

20. The integrated ADC of claim 19, wherein the delay circuit comprises a plurality of serially coupled logic gates having an input coupled for receiving the reference signal and producing the enable signal at an output after the first delay.

21. A wireless communication device, comprising:
 a receiver circuit having an input coupled for receiving a radio frequency carrier signal and an output for providing an analog carrier signal;
 an analog-digital converter (ADC) having an input coupled for sampling the analog carrier signal to provide a sampled signal and converting the sampled signal to a digital signal in response to first and second clock signals; and
 a clock circuit for providing the first and second clock signals in response to a reference signal, the clock circuit including,
  (a) a delay circuit having an input coupled for receiving the reference signal and providing an enable signal after a first delay,
  (b) a switching circuit having first and second inputs coupled for receiving first and second input signals generated from the reference signal, and a control input coupled for receiving the enable signal to produce first and second synchronized signals at first and second outputs, and
  (c) a non-overlapping clock generator having first and second inputs coupled for receiving the first and second synchronized signals, and first and second outputs for providing the first and second clock signals.

22. The clock circuit of claim 21, wherein the delay circuit comprises a plurality of serially coupled logic gates having an input coupled for receiving the reference signal and producing the enable signal at an output after the first delay.

* * * * *